March 21, 1967  D. P. DAUER  3,310,184
SILO DISTRIBUTOR

Filed June 25, 1965  3 Sheets-Sheet 1

INVENTOR
DAVID P. DAUER
BY Olsen and Stephenson
ATTORNEY

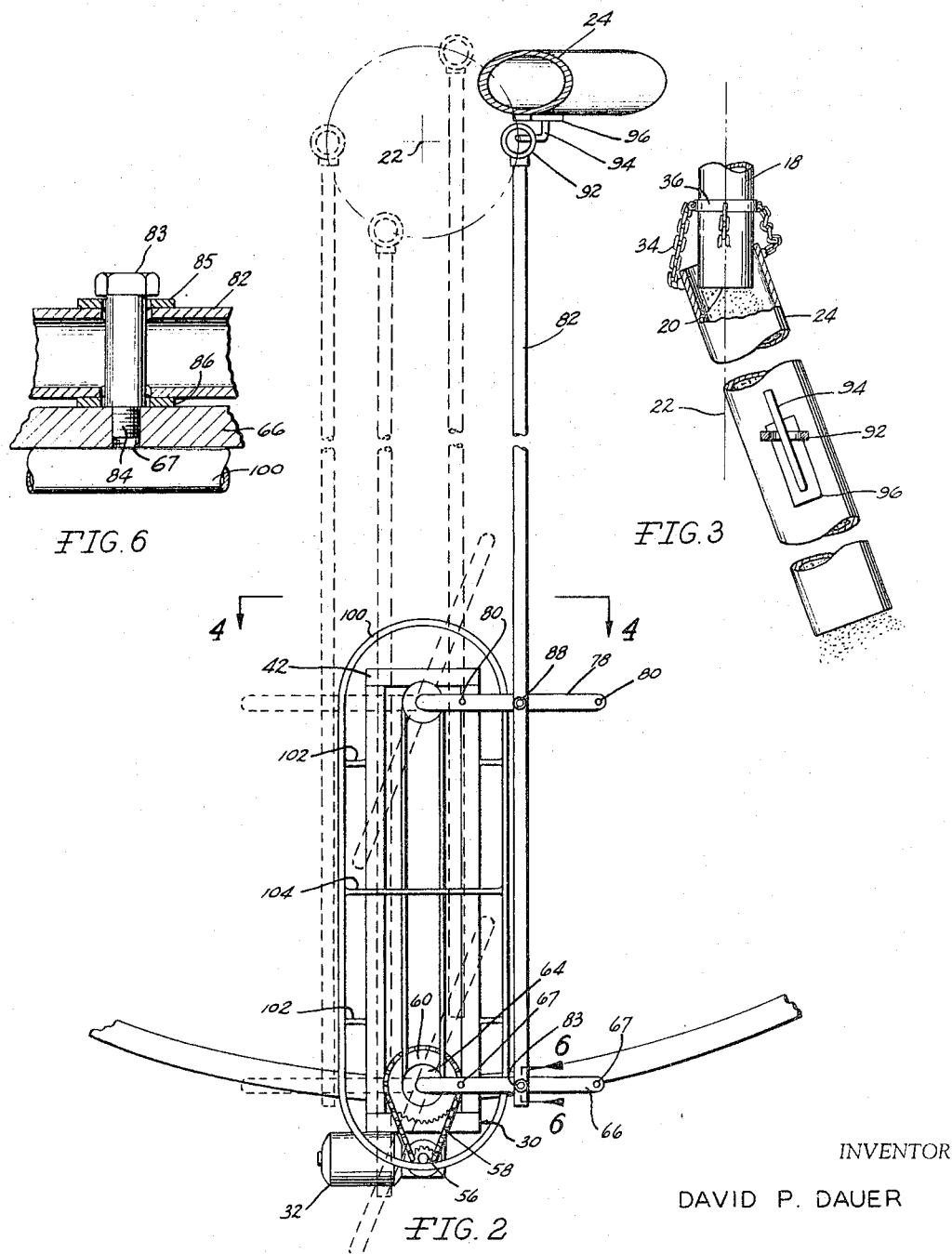

March 21, 1967 D. P. DAUER 3,310,184
SILO DISTRIBUTOR

Filed June 25, 1965 3 Sheets-Sheet 3

INVENTOR
DAVID P. DAUER

BY *Olsen and Stephenson*
ATTORNEY

United States Patent Office 3,310,184
Patented Mar. 21, 1967

3,310,184
SILO DISTRIBUTOR
David P. Dauer, Manchester, Mich., assignor of one-half to James C. Hendley and Virginia C. Hendley
Filed June 25, 1965, Ser. No. 466,908
7 Claims. (Cl. 214—17)

This invention relates to a silage distributor.

Various silage distributors have been employed in the past to evenly distribute silage as it is deposited from a conveyor into a silo. Without a silage distributor, an uneven cone-shaped buildup of silage occurs beneath the conveyor outlet. Uneven filling of the silo has numerous disadvantages particularly with high tower silos. These disadvantages include uneven wall pressures on the silo, adverse fermentation and silage spoilage, a substantial reduction in silo capacity and, to some extent, an adverse effect on the operation of silo unloaders. It is highly desirable to fill the silo evenly about the periphery of the silo with the silage slightly concave at the center. Various silo distributors employed heretofore either fail to accomplish even distribution of the silage or often are structurally complex and relatively expensive.

The objects of this invention are to provide a silo distributor that achieves even silage distribution; that is readily usable with various types of silos and silo loaders; that has a simple and sturdy construction; that operates simply; and that is economical to purchase and use.

Further objects, features and advantages of this invention will become apparent from a consideration of the following description, the appended claims, and the accompanying drawing in which:

FIGURE 2 is a top view of the linkage for revolving the chute to evenly distribute the silage in the silo;

FIGURE 3 is a view of the chute and a portion of a blower tube looking radially inwardly of the silo from the linkage;

FIGURE 6 is an enlarged vertical section taken on line 6—6 of FIG. 2; and

Figure 1:
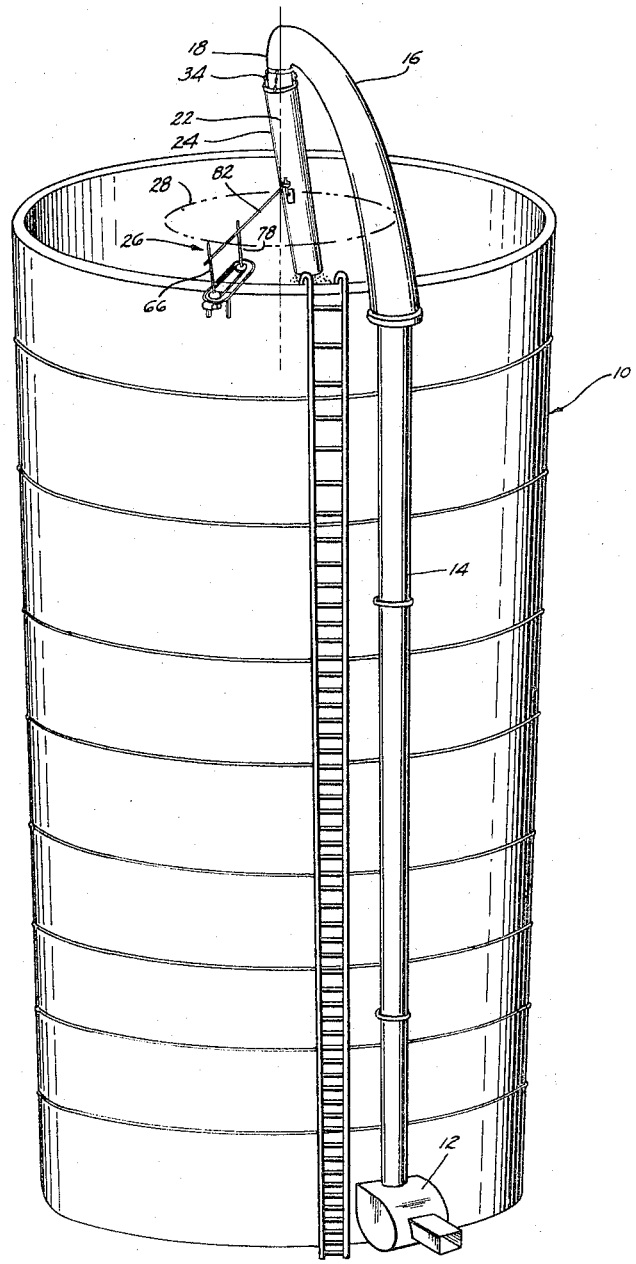
FIGURE 1 is a perspective view of the silage blower positioned on a tower silo and equipped with a silage distributor having a revolving chute and an actuating linkage constructed in accordance with the present invention.
Figure 4:
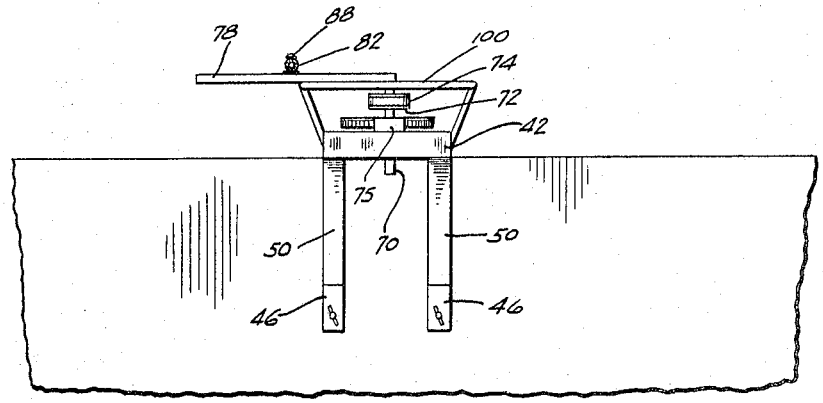
FIGURE 4 is an end view of the linkage taken on line 4—4 of FIG. 4 to illustrate a mounting frame that supports the linkage on the top of a silo wall.
Figure 5:
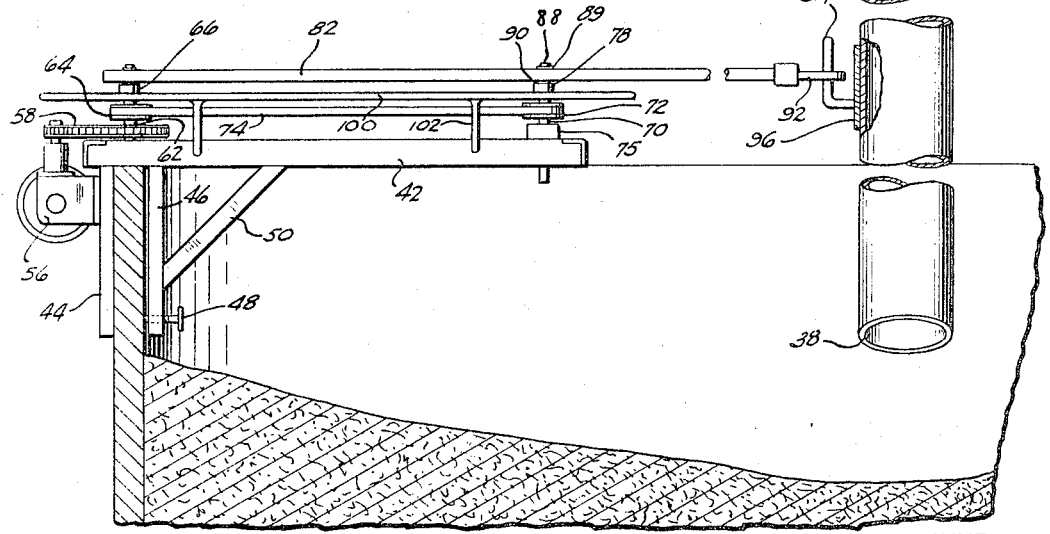
FIGURE 5 is a side view of the silage distributor mounted on the silo to further illustrate the construction of the frame, the linkage, and the chute.

Referring to the drawings, FIG. 1 illustrates a large tower silo 10 which is open at its upper end to facilitate filling of the silo. A silage blower 12 is disposed at the bottom of silo 10 and arranged to receive silage from a hopper (not shown). A vertical riser tube 14 connected to the outlet of blower 12 is supported on the outside of silo 10 to transfer silage to the top of the silo. Connected to the top of tube 14 is a gooseneck tube 16 extending above and radially inwardly of silo 10. Tube 16 is fashioned with a terminal portion 18 curved vertically downwardly and open at its lower end to form an outlet 20 (FIGS. 3 and 5). Tube 16 is preferably formed of telescoping sections which can be adjusted radially of silo 10 to dispose outlet 20 above a vertical center axis of the silo illustrated by line 22.

A silage distributor constructed in accordance with the present invention generally comprises a discharge chute or tube 24 suspended on portion 18 of the tube 16. A rotating linkage 26 is connected to tube 24 to revolve the lower end of tube 24 about axis 22 in a generally circular path designated by numeral 28. Linkage 26 is carried on a frame 30 (FIG. 2) mounted on the top wall of silo 10 and is actuated by an electric motor 32 also mounted on frame 30 so that frame 30 carries substantially the entire weight of the distributor.

Tube 24 is nested loosely over the lower end of the portion 18 of tube 16 and is suspended on portion 18 by four chains 34. Chains 34 have their lower ends fastened about the upper periphery of tube 24 and their upper ends fastened on a ring 36 which in turn is secured on portion 18. Ring 36 may be a releasable clamp which can be adjusted vertically on portion 18 to vary the height of tube 24. Tube 24 is formed of heavy gauge sheet metal and has a circular cross section. The lower open end of tube 24 forms a discharge outlet 38. With ring 36 fastened in place, tube 24 hangs free and loose for movement by linkage 26 along path 28 to evenly distribute silage from outlet 38 around the wall of silo 10.

Frame 30 comprises a generally rectangular platform 42 disposed horizontally and projecting radially inwardly of silo 10. Platform 42 is constructed with angle iron beams. Welded on the lower rear portion of platform 42 are a pair of downwardly depending legs 44 which are spaced apart laterally and abut the exterior of silo 10. Spaced radially inwardly from legs 44 and welded on platform 42 are a pair of downwardly depending legs 46 which are spaced apart laterally and abut the interior of silo 10. A hand screw 48 is threaded in the lower end of each leg 46 to tighten against silo 10 and secure legs 46 and thus platform 42 tightly in place. Each of the legs 46 are strengthened by a respective corner brace 50. Although silo 10 has been disclosed as an open top silo, a silo distributor constructed in accordance with the present invention is also useful with covered silos. With a covered silo, platform 42 can be mounted on the silo wall. Motor 32 is mounted at the rear of platform 42 on legs 44 and has its output shaft drivingly connected in a right angle drive 56 also fastened on legs 44. Drive 56 in turn is connected to a chain drive 58 having a driven sprocket 60 keyed on a vertical shaft 62. Shaft 62 has its lower end journaled on the rear portion of platform 42, as by a pillow block (not shown), so that shaft 62 is rotatable and fixed against vertical movement.

Also mounted nonrotatably on shaft 62 is a pulley 64 disposed above sprocket 60 and a radial arm 66 which is fastened on the upper end of the shaft 62 and provided with three tapped holes 67 spaced along arm 66 radially of shaft 62. Pulley 64 is drivingly connected to a second vertical shaft 70 by a pulley 72 and a V-belt 74. Shaft 70 has its lower end journaled on the front portion of platform 42 by a thrust bearing 75 so that shaft 70 is rotatable and fixed against vertical movement. A second radial arm 78 nonrotatably fastened on the upper end of shaft 70 has three tapped holes 80 spaced along arm 78 radially of shaft 70. A tubular rod 82 is pivotally connected on arm 66 radially outwardly of shaft 62 by a pin 83 having an inwardly stepped end portion 84 threaded in the middle one of the holes 67. A pair of washers 85, 86 are disposed on bolt 83 above and below rod 82. Rod 82 is also pivotally connected on arm 78 by a pin 88 threaded in the middle one of the holes 80 with rod 82 being flanked by a pair of washers 89, 90 disposed on bolt 88. Fastened on the other end of rod 82 is a small ring 92 which hooks over and encircles an L-shaped, hooked rod 94 welded at its lower end to a plate 96 fastened on the lower end of tube 24. With tube 24 suspended on portion 18, rod 82 can be assembled on rod 94 by merely hooking ring 92 over the free upper end of rod 94 or disassembled by raising the ring 92 until it clears rod 94. Ring 92 is free to move vertically on rod 94 while tube 24 revolves. With rod 82 connected to tube 24, the tube is inclined downwardly from portion 18 and radially outwardly from the center axis 22 of silo 10 (FIG. 3). Other suitable means could also be used such as a clevis on tube 24, loosely engaged with rod 82 by a pin.

Arms 66 and 78 are substantially coplanar with the distance between pin 88 and shaft 70 being equal to the distance between pin 83 and shaft 62 and the distance between pins 83, 88 being equal to the distance between shafts 62, 70. Arms 66, 78 and rod 82 resemble a parallelogram linkage so that rod 82 is caused to shift longitudinally and laterally as shafts 62, 70 rotate. As shafts 62, 70 rotate, arms 66, 78 rotate in unison as illustrated in broken lines in FIG. 2 to move tube 24 along path 28. Rod 82 may be provided with several holes for receiving pins 83, 88 to adjust the length of rod 82 radially of silo 10. The additional holes 67, 80 in arms 66, 78 are used to adjust the radial position of rod 82 relative to shafts 62, 70 and thus vary the radius of the circular path 28. Rod 82 could be mounted by suitable means to achieve a continuously adjustable turning radius. Although in the preferred embodiment, shaft 62 is driven by chain drive 58 and shaft 70 is in turn driven by shaft 62 and belt 74, belt 74 can be eliminated without impairing substantially the operation of the linkage. If desired a suitable housing may also be mounted on platform 42 to enclose shafts 62, 70, belt 74, drives 56, 58 and motor 32.

Disposed just below arms 66, 78 is an oval track 100 in the form of a continuous rod secured on platform 42 by four struts 102 welded on track 100 and platform 42. Track 100 is reinforced with a central brace 104. Track 100 extends forwardly and rearwardly of platform 42, encircling shafts 62, 70, to support arms 66, 78 while they rotate. Arms 66, 78 slide on the track and thus prevent excessive stress on the arms and shafts 62, 70.

In use platform 42 is fastened to the top of the wall of silo 10. The length of tube 16 is then adjusted so that outlet 20 can be disposed vertically in line with the center 22 of the silo 10. Tube 24 is then fastened on the terminal portion 18 of tube 16 and tube 16 is fastened in place on riser tube 14. Rod 82 is coupled to tube 24 by hooking ring 92 over rod 94. Rod 82 is then fastened on arms 66, 78 by pins 83, 88 at a radial position selected to achieve a desired circular path of the tube 24. During a silo filling operation, linkage 26 revolves outlet 38 of the tube 24 in a generally circular path about the axis 22 to distribute silage evenly about the outer periphery of silo 10. Rotational speeds of linkage 26 and chute 24 in the order of from four to eight revolutions per minute achieve satisfactory results. As tube 24 revolves about the center axis 22 it also, in effect, revolves about its own axis. Stated differently, tube 24 when viewed from the center 22 will appear to rotate about its own longitudinal axis in a first rotational direction as tube 24 makes one revolution about axis 22 in the opposite rotational direction.

Figure 7:
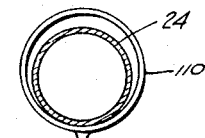
FIGURE 7 is a view illustrating a modification in connection between the linkage and the chute.

FIG. 7 illustrates a modification wherein a hoop 110 is fastened on the end of a rod 112. Hoop 110 encircles the discharge chute or tube 24 (FIGS. 1-5). Rod 112 corresponds to rod 82 (FIGS. 1-5) with hoop 110 replacing ring 92 and rod 94 (FIGS. 1-5) to couple rod 112 to tube 24. Rod 112 is moved by the rotating linkage 26 in the manner disclosed in connection with FIGS. 1-5 to revolve the outlet 38 of tube 24 in a circular path.

Although the silage distributor has been disclosed in the preferred embodiment as rotating the outlet 38 of tube 24 about the center of silo 10 with the outlet 20 of portion 18 above the center of the silo, it is not essential that outlet 20 be disposed in line with the center of the silo. Outlet 20 can be offset from the center of the silo and the length of rod 82 selected to rotate outlet 38 in a circle about an axis inclined vertically to outlet 20.

It will be understood that the silage distributor which is herein disclosed and described is presented for purposes of explanation and illustration and is not intended to indicate limits of the invention, the scope of which is defined by the following claims.

What is claimed is:

1. A silage distributor for use with a silage blower or the like having a discharge pipe formed with an outlet which opens in a generally downwardly direction, comprising a tubular chute, means suspending said chute on said pipe with the upper end of said chute nested over said pipe and communicating with said outlet and with the lower end of said chute being free to swing in a circular path through 360 degrees about a generally vertical axis, and linkage means for swinging said lower end of said chute through a 360 degree circular path about said vertical axis comprising a first generally horizontal link having one end interengaged with said chute, second and third parallel spaced generally horizontal links pivotally connected to said first link at spaced intervals remote from said one end, and means mounting said second and third links for rotation about parallel vertical axes spaced radially from the pivotal connections between said first link and each of said second and third links.

2. In combination, a tower silo, an inlet tube disposed in the upper portion of said silo and opening in a generally downwardly direction adjacent the center of the silo, a tubular chute nested over the lower end of said inlet tube and depending generally downwardly from said inlet tube, means suspending the upper end of said chute on the lower end of said tube with said tube hanging free and loose on said tube, a rod-like member, means interengaging one end of said member with said chute, the other end of said member extending radially outwardly of said silo, a frame mounted on said silo, and rotating linkage means carried by said frame and coupled to said rod-like member for shifting said member laterally and longitudinally to rotate the lower end of said chute in a generally circular path about the center of said silo, said linkage means comprising a first vertical shaft journaled on said frame radially outwardly from said center, a second vertical shaft journaled on said frame radially outwardly from said center beyond said first shaft, a first radial arm nonrotatably mounted on said first shaft, a second radial arm nonrotatably mounted on said second shaft, first means pivotally connecting said rod-like member on said first arm radially outwardly from said first shaft, second means pivotally connecting said rod-like member on said second arm radially outwardly from said second shaft, and means for rotating one of said shafts to revolve the radial arm on said one shaft.

3. The combination set forth in claim 2 wherein said first pivot means comprises means for releasably and fixedly mounting said first pivot means on said first radial arm at selected positions radially of said first shaft and said second pivot means comprises means for releasably and fixedly mounting said second radial arm at selected positions radially of said second shaft.

4. In combination, a tower silo, a silage discharge tube disposed in the upper portion of said silo and opening in a generally downward direction adjacent to the center of the silo, a tubular chute forming an extension of said tube and being connected to said tube so that the lower end of said chute can be moved in an orbit around an extension of the axis of said tube, a frame mounted on the wall of said silo radially outwardly of said chute, a pair of rotatable members carried by said frame for rotation about parallel vertical axes each of which intersects a common line radiating generally from the axis of said tube, a rod pivotally connected to each of said rotatable members and coupled to said chute so that when said rotatable members are rotated the lower end of said chute will move in said orbit, and means for rotating said members.

5. The combination according to claim 4 wherein means are provided for varying the location of pivotal connection of the rod to each of said rotatable members for selectively varying the path of orbit of said chute.

6. A silage distributor for use with a tower silo having a silage filling tube disposed in the upper portion of the silo and opening in a generally downward direction adjacent to the center of the silo, said silage distributor comprising a tubular chute means for supporting said tubular chute from said tube as an extension thereof and so that the lower end of the chute is free to revolve in a generally circular path through 360 degrees about a vertical axis, a frame adapted to be mounted on the wall of said silo, a pair of rotatable members carried by said frame for rotation about parallel vertical axes which are located so as to be in a common vertical plane with said vertical axis, a rod pivotally connected to each of said rotatable members at similar locations thereon and to said tubular chute so that when said rotatable members are rotated the lower end of said chute will move in said circular path, and means for rotating said rotatable members.

7. A silage distributor according to claim 6, wherein means are provided for selectively altering the location of the pivotal connections of the rod on the rotatable members for changing the diameter of the circular path of movement of the lower end of said chute.

References Cited by the Examiner

UNITED STATES PATENTS 3,145,855   8/1964   Plugge et al.         214—17

FOREIGN PATENTS 78,317   10/1954   Denmark.

GERALD M. FORLENZA, *Primary Examiner.*

ROBERT G. SHERIDAN, *Examiner.*